(12) United States Patent
Schmid et al.

(10) Patent No.: US 6,881,819 B2
(45) Date of Patent: *Apr. 19, 2005

(54) LIQUID INITIATOR FOR CARRYING OUT ANIONIC LACTAM POLYMERIZATION IN AN ACCELERATED MANNER, METHOD FOR THE PRODUCTION THEREOF AND ITS USE

(75) Inventors: Eduard Schmid, Bonaduz (CH); Ivano Laudonia, Thusis (CH)

(73) Assignee: EMS-Chemie AG, Domat (CH)

( * ) Notice: Subject to any disclaimer, the term of this patent is extended or adjusted under 35 U.S.C. 154(b) by 217 days.

This patent is subject to a terminal disclaimer.

(21) Appl. No.: 10/168,591

(22) PCT Filed: Nov. 30, 2000

(86) PCT No.: PCT/EP00/12053

§ 371 (c)(1),
(2), (4) Date: Sep. 20, 2002

(87) PCT Pub. No.: WO01/46293

PCT Pub. Date: Jun. 28, 2001

(65) Prior Publication Data

US 2003/0149229 A1 Aug. 7, 2003

(30) Foreign Application Priority Data

Dec. 21, 1999 (DE) .......................... 199 61 819

(51) Int. Cl.[7] ............................................. C08G 69/20
(52) U.S. Cl. ........................ 528/312; 528/310; 528/315; 528/316; 528/323; 528/326; 502/100; 428/402; 264/176.1; 264/209.2; 264/211.21; 264/212; 264/219; 264/239; 264/298; 264/299; 264/309; 264/328.1

(58) Field of Search ................................ 528/310, 312, 528/315, 216, 323, 326, 321; 502/100; 428/402; 264/176.1, 209.2, 211.21, 212, 219, 239, 298, 299, 309, 328.1

(56) References Cited

U.S. PATENT DOCUMENTS

| 3,875,121 | A | | 4/1975 | Brassat et al. |
|---|---|---|---|---|
| 5,747,634 | A | * | 5/1998 | Schmid et al. ............... 528/315 |
| 5,756,647 | A | * | 5/1998 | Schmid et al. ............... 528/323 |
| 5,760,164 | A | | 6/1998 | Schmid et al. |
| 5,864,007 | A | | 1/1999 | Schmid et al. |
| 6,013,758 | A | | 1/2000 | Schmid et al. |
| 6,579,965 | B1 | * | 6/2003 | Hoogen et al. ............... 528/323 |

FOREIGN PATENT DOCUMENTS

| DE | 2 230 732 C3 | 1/1974 |
|---|---|---|
| DE | 196 02 684 C1 | 8/1997 |
| DE | 196 03 305 C2 | 8/1997 |
| DE | 196 02 683 C1 | 9/1997 |
| DE | 197 15 679 A1 | 10/1998 |
| EP | 0 438 762 B1 | 7/1991 |
| EP | 0 786 482 A2 | 7/1997 |
| EP | 0 786 484 A2 | 7/1997 |
| EP | 0 786 486 B1 | 7/1997 |
| EP | 0 872 508 A1 | 10/1998 |
| GB | 1 099 759 | 1/1968 |

* cited by examiner

Primary Examiner—P. Hampton Hightower
(74) Attorney, Agent, or Firm—Marshall & Melhorn, LLC

(57) ABSTRACT

The invention relates to a liquid initiator for carrying out anionic lactam polymerization. The liquid initiator contains a conversion product of isocyanate (1) with a protic compound (P) and a base (B) in an aprotic solvation agent (S).

33 Claims, 4 Drawing Sheets

Fig. 1

Nylostab S - EED 1,3-benzendicarboxamide,N,N'-
bis(2,2,6,6-tetramethyl-4-piperidinyl)

Fig. 2

TINUVIN 770

Mw = 481, Mp = 81-85 °C
CAS: 52829-07-9

Fig. 3

CHIMASSORB 81

TINUVIN 571

Mw = 393.6, Mp = liquid
CAS: 23328-53-2

LIQUID INITIATOR FOR CARRYING OUT ANIONIC LACTAM POLYMERIZATION IN AN ACCELERATED MANNER, METHOD FOR THE PRODUCTION THEREOF AND ITS USE

BACKGROUND OF THE INVENTION

1. Field of the Invention

The invention relates to a novel liquid initiator for the accelerated implementation of the polymerisation of lactam, the production thereof, the use thereof and also the utility objects produced therefrom.

2. Discussion of Related Art

Liquid catalysts for the polymerisation of lactam have been known for a fairly long time. They comprise additives to sodium caprolactamate which have the effect that it is liquid at room temperature. These catalysts do not adequately accelerate the polymerisation and must be applied at a relatively high concentration. Examples are DE 2 230 732 C3 and EP 0438 762 B1. In DE 19 602 683 and DE 19 602 684, liquid catalysts are described for the first time which additionally exert an accelerating effect on the polymerisation. They comprise in particular N-substituted cyclic ureas or N-substituted acid amides, acylation medium for lactam and commercially available sodium caprolactamate, dissolved in lactam-6. It is disadvantageous that they must be applied in a relatively high concentration which can influence the polymer properties, for example the modulus being reduced, an exudation of the solvation components can occur and also the adhesion to optionally used fillers can be impaired.

In DE 197 15 679 A1, a synthesis of liquid catalyst is demonstrated which eliminates many of these disadvantages. Thus lactam-free sodium caprolactamate is produced directly in the solvation medium and converted preferably with carbodiimide. In order to implement the lactam polymerisation, a weight proportion of approximately 1% of such catalysts is quite sufficient.

A liquid multi-component system for implementation of the anionic lactam polymerisation is known furthermore from DE 196 03 305 C2, in the case of which a salvation medium, a catalyst and an activator are used together as a multicomponent system. In the case of this multicomponent system, the individual components are hence used in a solvated form as liquid catalyst. The limited shelf life inter alia is hereby of disadvantage.

In the methods disclosed to date for polymerisation of lactam by means of liquid catalyst with accelerated effect, the used starter materials are mainly sodium caprolactamate, lactam-acylating compounds and also solvation media.

For many applications however, liquid catalyst or other systems are desired which comprise only one component and which contain no sodium caprolactamate and hence can be applied in an even smaller concentration. It is furthermore the objective to make available sodium caprolactamate-free liquid systems which are able to control the start-up phase of polymerisation in a predetermined manner.

Furthermore, liquid systems with a long shelf life are of great interest which contain components which positively influence the processing behaviour and also the end product properties, such as for example facilitate the releasing of the finished parts or else improve oxidation-, heat- and weathering stability.

SUMMARY OF THE INVENTION

The object is achieved by the features of patent claim 1 with respect to the liquid system and by the features of patent claim 20 with respect to the production method. The polymer granulate is defined by the characterising features of claim 26. The use of the finished parts is indicated in claim 31. The sub-claims demonstrate advantageous developments.

The invention therefore relates to a liquid initiator, a method for producing the same and the use thereof.

BRIEF DESCRIPTION OF THE DRAWINGS

The above, as well as other advantages of the present invention, will become readily apparent to those skilled in the art from the following detailed description when considered in the light of the accompanying drawings in which.

DESCRIPTION OF THE PREFERRED EMBODIMENT

The initiator according to the invention therefore replaces the multicomponent systems which are known to date from the state of the art. The initiator thereby inherently contains the necessary structural elements in order to form both the catalyst and the activator when in contact with lactam.

It is a characteristic of the initiator according to the invention that the metal lactamate required for the anionic polymerisation of lactam does not yet exist but is only formed in an advance reaction.

In the example of isocyanate converted with alcohol and than deprotonated via the effect of a strong base, this reaction step which precedes lactam polymerisation can be represented as follows (Reaction I):

Lactam in high excess

HOR means the formed alcohol and $M^+$ $LC^-$, metal lactamate.

In the high lactam excess existing at the start of the polymerisation, the protic compound P is replaced by lactam, as a result of which the acylated lactam structure required for the accelerated lactam polymerisation is produced and the strongly basic nitrogen simultaneously forms lactamate, as a result of which the actual catalyst is formed and the polymerisation is initiated.

If the protic compound P is a low molecular alcohol, for example methanol, then substitution is effected rapidly, and the volatile alcohol can escape easily from the reaction mixture. A very low application concentration is further on sufficient for such systems, which makes them exceptionally economical in the application thereof. Since the isocyanate used in the liquid initiator is already converted into a non volatile salt form, the strong toxic effect of the isocyanate is eliminated which clearly increases the application safety of such catalysts.

If P is of higher molecular weight and/or has a steric hindrance, the substitution reaction can be slowed down and the polymerisation of lactam only starts with a time delay. This is particularly of importance when a special method step precedes the polymerisation, such as for example the impregnation of filament structures, such as for example layers of carbon fibre tissues which form the reinforcing structures of thermoplastic matrix composites and, for the economical production of which, a low viscous melt for the impregnation is crucial with respect to the method. Because of the formation of activated lactam and sodium lactamate only in the pre-polymerisation step according to Reaction I), the initiator according to the invention is particularly suited for the formation of polylactam as matrix of composite materials or of highly filled products.

If a molecule, which in the finished product fulfils additional tasks, is chosen directly as protic compound P, such as for example for the improvement of the stabilisation against heat- and weathering damage or in addition the releasing behaviour of the finished part, then as a result of steric hindrance or inadequate basicity for sufficient deprotonation of lactam, delays in the polymerisation may occur. In such cases, combinations of protic compounds are suitable. For example a proportion thereby takes over the intended additional task and a proportion ensures an adequately rapid polymerisation. In these cases, a defined proportion of P, in the form of low molecular weight, alcohol or also acid amide, such as for example lactam-6, lactam-4 or lactam-12, advantageously remains.

Whilst in the start phase of the polymerisation, the substitution equilibrium according to Reaction I) controls the polymerisation course, the basicity difference between lactamate and remaining depronated compound is in its subsequent course decisive determining for the reaction course.

In order to manage in particular in the end phase of the polymerisation without substantial polymerisation delay, carboxamides are chosen preferably as protic compound since their substitutable H-atom essentially has the same acidity as lactam as cyclic carboxamide. Carboxamides of higher molecular weight which are replaced by lactam with a time delay, can improve in particular the mold-release behaviour of the finished part as an additional task and effect stability against weathering- and heat degradation.

From a structural point of view, in particular aliphatic, cycloaliphatic and aromatic organic compounds with solvating acting structural elements, which have no azide H-atoms, are suitable as solvation medium S. Solvating structural elements in the sense of the invention are for example heteroatoms and hetero groups of the type:
—O—, —CO—, —O—CO—O—, —SO$_2$—, —CO—NR—, —CO—O—, —NR—CO—O, —NO—, —CN—, —RN—CO—NR—, —NR—, —P(OR)$_3$—, —PO(OR)$_3$— and also phenol ether.

The lines on the structural elements thereby imply the chemical bonds of the structural elements in the organic compound which represents the solvation medium, and a salvation medium molecule can contain a plurality of solvating structural elements.

The solvation medium can also be a mixture of a plurality of solvating components.

Suitable solvating components are in particular N-alkylated, cyclic carboxamides, such as N-alkylated lactam-4, -5 and -6, for example N-methyl-, N-hexyl-, N-cyclohexyl- and N-octylpyrrolidone and also N-octyl and N-methylcaprolactam and completely N-alkylated, in particular cyclic urea compounds and the alkyl radical R contain 1–12 C-atoms.

These products correspond to the formulae $n_1$ being 2 and 3 and $n_2$ being 3 to 5 and R being an alkyl radical with 1–12 C-atoms which can also contain hetero groups and heteroatoms such as —O—.

Suitable, non-cyclic urea derivatives and acid amides are for example tetraalkylurea, such as for example, tetrabutylurea, diethylacetamide and dibutylformamide.

Further salvation media are for example, cyclic propylene carbonate, etherified polyols, for example of the basic structure H$_3$C—O—(CH$_2$—CH$_2$—O)$_n$—CH$_3$ with a molecular weight up to approximately 1500, esterified polyglycols, such as for example di- and triethylene glycol diacetate, liquid phthalic esters and cyclic ethers, such as for example dioxane. Mixtures of the described salvation media are also often used.

The salvation medium S must be in the position by means of its solvating structural elements to solvate the deprotonated conversion product of cyanate with P and thereby in particular the cation such that a storage-stable product which is liquid at room temperature, results. Furthermore it has to be sufficiently stable to serve as reaction medium. During initiation of the polymerisation of lactam it must, according to the chosen method variant, boil sufficiently highly in order not to effect bubble formation of the melt or it must volatilize in part or completely, for example during a continuous method, for example in a twin shaft extruder. Therefore both high and also low boiling components S are suitable according to the provided application method.

If one wants for example to impregnate reinforcing fibre structures with freshly activated lactam melt without bubble formation in a discontinuous process, then salvation media with a boiling point of at least 200° C. are advantageous; if one wants to convert lactam in the extruder continuously into polylactam then a low boiling solvation medium with a boiling point for example below 180° C. is of advantage if a softening effect is not desired.

In many cases it is of special advantage to extend the solvation component by means of compounds with a special effect. These can for example help to protect the polylactam after completion of polymerisation against degradation by light, heat and oxidation.

Components also in small quantities which exert a nucleating or releasing effect in the polylactam are often desired, likewise additives with a flexibilizing effect, such as for example o-phthalic esters, completely esterified polyols, for example of ethylene glycol or glycerine with acetic acid.

Further additives to be used are for example to optical brighteners and so-called tracers. The necessary quantity for use is thereby tested and state of the art and can be deduced from the technical data sheets of such products.

The protic compound P and the base B should be considered together, since in the present invention, P is used preferably in the strongly basic, deprotonated form.

One can hence for example proceed in such a manner that the isocyanate is converted with P, for example an alcohol and the H thereby transferred to the nitrogen is subsequently removed via a reaction with a strong base, such as for example methylate.

This can be represented corresponding to the reaction course II.

(II)

the conversion being effected in the selected solvation medium and the protonated base (example methanol) is removed for example via vacuum effect.

Alternatively, P is initially converted into the basic anionic form via reaction with a strong base and subsequently converted as anion with the isocyanate.

Suitable protic compounds, with adequately azide H are for example alcohols from C-number 1 upwards to 5. Suitable representatives are for example methanol, ethanol, propanol, specially suited P are furthermore carboxamides. Dependent upon their structural composition, the start phase of the polymerisation can be affected substantially and they can take over additional tasks in the finished part, such as for example improving the mold-release behaviour. Components for carboxamides are monomers with 1–20 C-atoms, for example mono- and diamines such as hexylamine, cyclohexylamine, isotridecylamine, diaminohexane and ether group-containing mono- and diamines and also mono- and dicarboxylic acids such as acetic acid, 2-ethylhexane acid, nonanoic acid and adipic acid. In order to make available low molecular carboxamides, for example a monoamine is thereby converted with a monocarboxylic acid or a diamine with 2 mol units monocarboxylic acid or also a dicarboxylic acid with 2 mol units monoamine.

Figure 1:
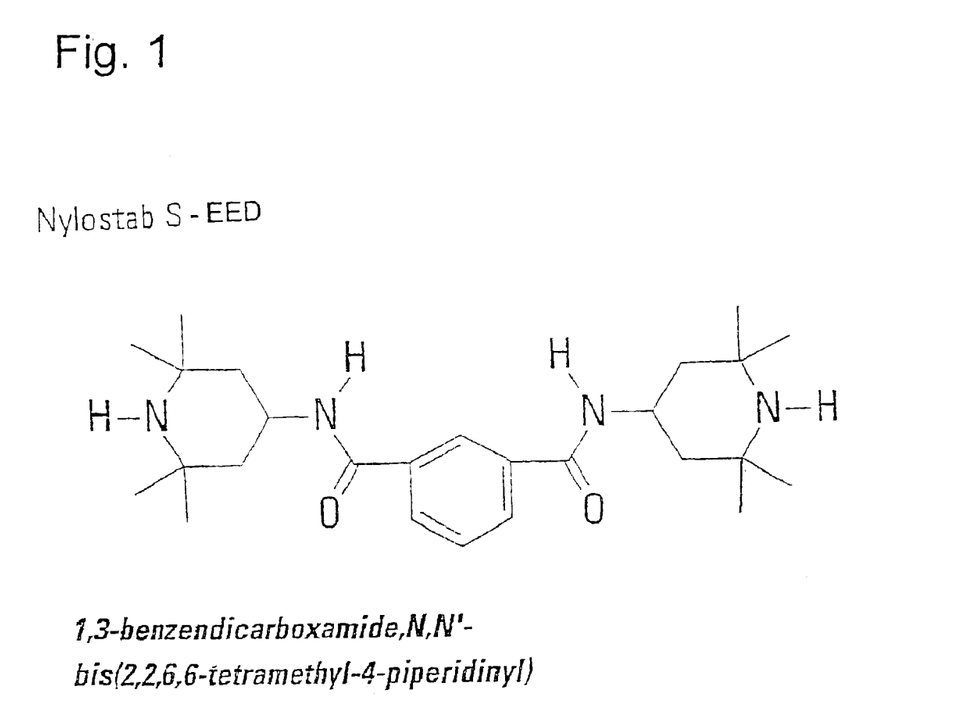
FIG. 1 shows the chemical structure of Nylostab S-EED (1,3-benzendicarboxamide, N,N'-bis(2,2,6,6-tetramethyl-4-piperidinyl).
Figure 2:
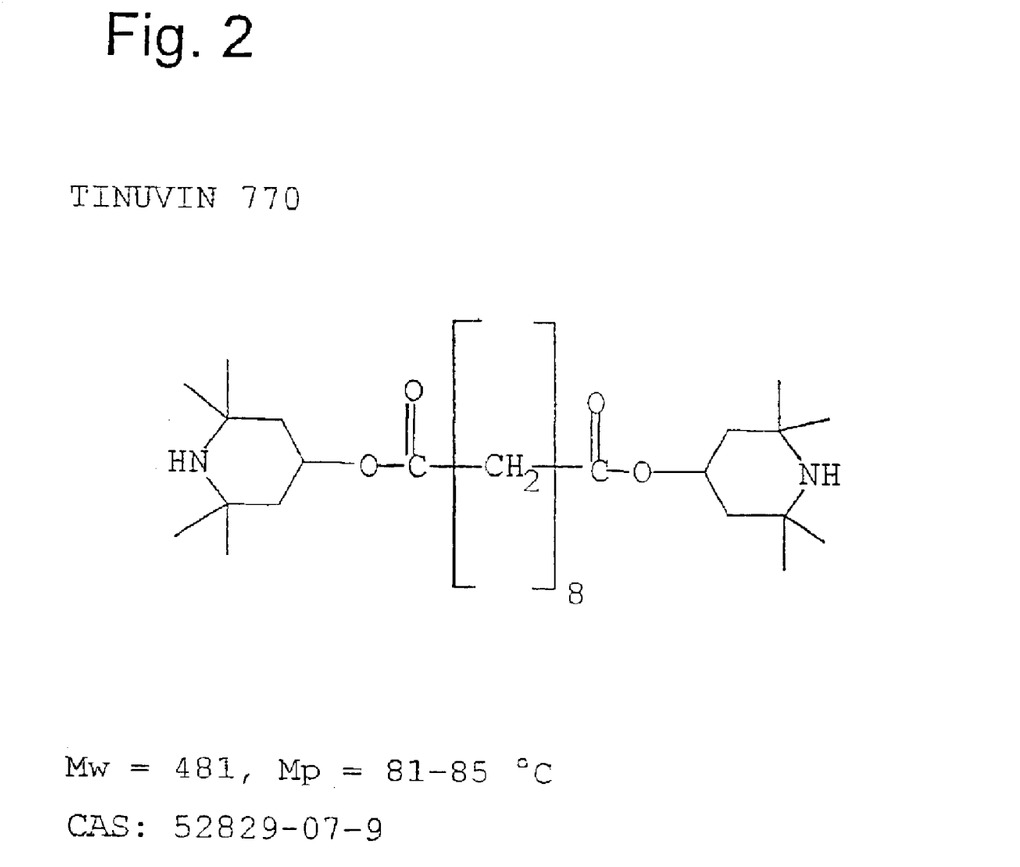
FIG. 2 shows the chemical structure of Tinovin 770, along with physical properties thereof.
Figure 3:
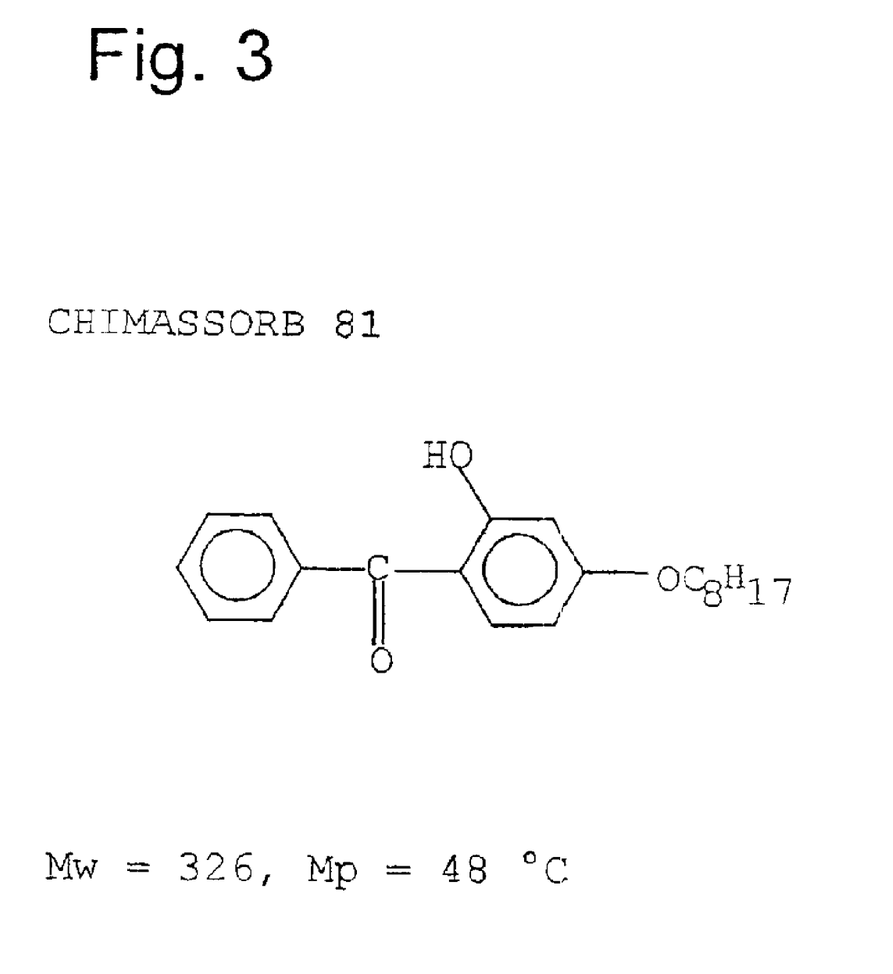
FIG. 3 shows the chemical structure of Chimassorb 81, along with physical properties thereof.
Figure 4:
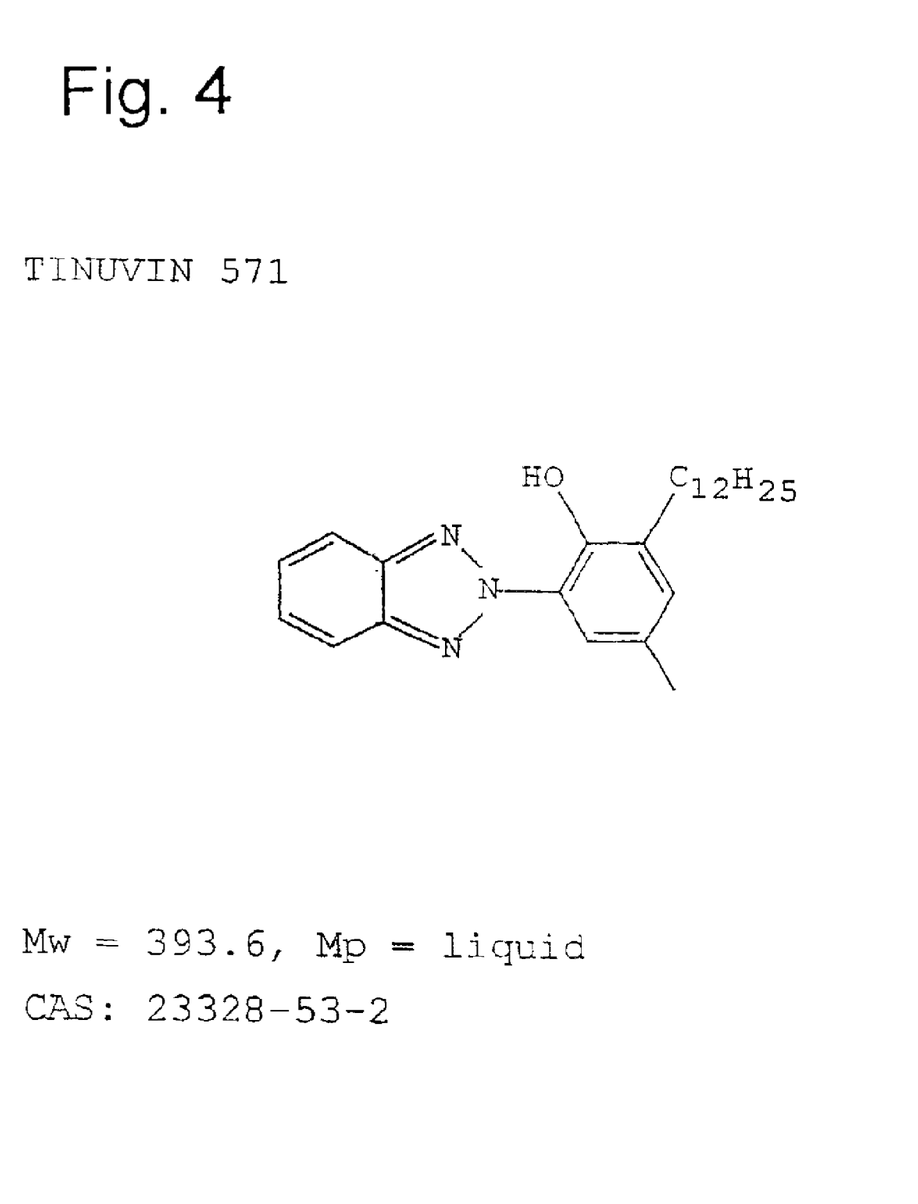
FIG. 4 shows the chemical structure of Tinuvin 571, along with physical properties thereof.

Furthermore special, generally sterically hindered amines are suitable, which amines can also directly contain amide groups for example and are able to stabilise the polylactam against heat and light degradation, such as for example the commercial products Nylostab S-EED® by Clariant and Tinuvino® 770 by Ciba SC and also in addition the stabilisers Chimassorb 81® and Tinuvin 571® likewise by Ciba SC, which contain OH-groups. The chemical structures of these compounds are illustrated in the drawings 1 to 4. The stabiliser Nylostab and Tinuvin 770 (Drawing 1 and 2) are also described as "hindered amine light stabiliser" (HALS).

These stabilisers are only cited by way of example because sterically hindered amines and hydroxy groups, in sterically hindered phenolic form are essential compound classes which serve as heat and light stabilisers for polyamides. Further suitable addition compounds P are for example butanonoxime, malonic acid esters, such as for instance diethylmalonate, azo compounds, such as 1.2.4-triazole and 3.5-dimethylpyrazole. Such compounds should only constitute a proportion of P and be used only in combination with methylate.

The base B for the deprotonation for example according to Reaction 2 must have a basicity which is adequate for the reaction course and preferably be able to be withdrawn continuously under the action of heat and vacuum on performing deprotonation of the protic medium. Alternatively, it can, as for example the methylate, act directly as P, and be added at the isocyanate I.

Preferably used bases have an alkali, alkaline earth or tetraalkylammonium cation and an alcoholate, amide, hydride or alkylate as anion. If the anion is, for example alcoholate, it can act directly as addition compound.

Examples are alkali and alkaline earth metal alcoholates, especially methylates and ethylates, such as for example sodium methylate and -ethylate or alcoholates of lithium, potassium and magnesium or also tetraalkylammonium alcoholate, metal hydrides, such as for example sodium hydride, metal alkyls, such as for example butyllithium, amides, such as for example sodium amide, or else alkali or alkaline earth metals, which can for example be activated by means of iron (II) ions.

If a low molecular alcoholate or alkali or alkaline earth metal, such as for example sodium methylate is used as base, then it is advantageously added directly dissolved in the corresponding alcohol, said alcohol being removed when the conversion is going on via heat and vacuum effect. This concept can also be applied for others of the cited bases, such as for example butyllithium dissolved in heptane.

In the case of extremely air- and moisture-sensitive bases, such as for example metal hydrides or alkali metal, such as for example sodium, petroleum ether or an alkane can serve as protective medium for storage and addition, after which removal of this type of protective medium is effected again via the action of heat and vacuum.

These solvents and protective media for the base are therefore different in task and performance from the solvation media.

According to the invention, there can be used monoisocyanates and diisocyanates and also thioisocyanates which have an aliphatic, cycloaliphatic, aromatic or aliphatic-aromatic basic structure and the aromatic structure can for example be halogenated and alkylated.

Examples of liquid isocyanates are phenyl isocyanate and substituted phenylisocyanates, cyclohexylisocyanate, toluylenediisocyanate, hexamethylenediisocyanate, isophoronediisocyanate, diphenylmethanediisocyanate and dicyclohexylmethanediisocyanate.

Isocyanates do cyclize in a basic medium, in particular if they have no steric hindrance, often into isocyanurates or into another structure, such as for example allophanate. On their conversion under the effect of a strong base, in particular in the stoichiometric ratio, this structure is destroyed again and P⁻ reacts with the isocyanate (Reaction I, structure on the left). A main example is thereby the phenyl isocyanate and also substituted aromatic monoisocyanates.

Isocyanurates, such as for example tripropylisocyanurate or triphenylisocyanurate can also be used, whereby in the basic medium each isocyanurat after return cleavage does acylate three lactams.

The liquid initiator FI can also be a conversion product of which up to 50% of the isocyanate has been replaced by a carbodiimide. The carbodiimide can have an aliphatic, cycloaliphatic, aromatic or aliphaticaromatic basic structure.

Examples are: N,N'-diisopropyl carbodiimide, N,N'-di-(o-tolyl)-carbodiimide, N,N'-dicyclohexyl carbodiimide, 2,2',6,6',-tetraisopropylphenyl carbodiimide, and poly-(2,2'-diisopropyl)-p-phenylene carbodiimide.

Furthermore, additives Z, which are conditioned by property and application and which do not influence the polymerisation course or do so only to a small extent or as can be forseen, are added to the initiator in a defined proportion. Such additives are for example release agents, heat-, light- and oxidation stabilisers, wetting and adhesion agents for fillers, anti-foaming agents, nucleating agents, tracers, optical brighteners, lastizisers and colourants. Their recommended application concentration can generally be deduced for such products from the technical data sheets. Preferred additives should contain no azide H-atoms.

The above-described conversion product according to the invention is obtained such that the components B:P:I are used in a mol ratio to each other of 0.2 to 1.1:0.2 to 4:1. A preferred mol ratio of B:P:I is 0.8 to 1.1:0.8 to 1.2:1.

The invention relates furthermore to a method for producing the above-described conversion product.

The main component of the liquid initiator F with an accelerating effect is thereby always the solvation component S which serves extensively as reaction medium for the FK production. The production is effected from room temperature up to 140° C. under inert gas and with exclusion of moisture.

As first step for example, I is initially introduced into S. In the case where aromatic monoisocyanate, for example phenylisocyanate is used, the trimerisation reaction into isocyanurate is implemented firstly in a targeted way by addition of a catalytic quantity of base, such as for example sodium methylate.

In accompaniment to the subsequently effected addition of P, a strong base B, advantageously in a stoichiometric proportion to P, should also be used.

P which has already been converted into its basic form can also be used directly. Examples are alcoholates such as methylate, or also amides, such as for example the Na salt of the carboxamide from isotridecylamine and acetic acid.

It is also possible to add P advantageously in a stoichiometric proportion to I, which can already be trimerised, and subsequently, via addition of a base, which forms a low boiling neutralisation product, to implement the deprotonation of the converted I. The main example of a base which forms a volatile neutralisation product is sodium methylate, NaOMe, which can be used as solid material or as a solution in methanol.

Alternatively, a higher molecular P can be dissolved in a proportion of S and be converted into the salt form via action of B, such as for example NaOMe, by completely removing the alcohol produced on applying heat and vacuum and then deprotonized P is then added to the solution of the trimerised I.

As an intermediate step of the reaction, cloudiness can thereby occur or the reaction product can precipitate in part or completely which can occur in particular below 100° C. After completed conversion of the components I, P and B in S, the precipitate redissolves in general.

It is thereby so that, according to the application-related desired FI properties, the educts must be selected according to the foreseen task from the available solvation media, isocyanates, protic compounds and bases, and also the respective production method must be adapted to the raw materials which are used.

The liquid initiators are used in a continuous or discontinuous method for the polymerisation of lactam.

The lactam-free and storage-stable FI according to the invention can be added to the pure lactam melt in a concentration of approximately 0.3–10% by weight, whereby already low concentrations of 0.5–3.0% by weight lead to polylactam with excellent properties.

Lactam-12 and lactam-6 and mixtures thereof are particularly suitable thereby, there resulting polylactam with excellent hydrolysis stability and very good mechanical properties.

The FI according to the invention can be added to the lactam melt, for example lactam-6, at temperatures of 100° C. to 200° C. continuously in a defined volume proportion, for example via a continuously operating mixing unit of the company Dosiplast, FL 8496 Balzers, or also by means of a static mixer, for example of the firm Sulzer, Winterthur, after which for example the impregnation processes of the fibre structures are effected, or said FI can also be added to the lactam melt discontinuously in a defined volume proportion with subsequent rapid mixing, after which enough time is available for the now occurring shaping.

It is favourable that even a low volume proportion of 1–10, in particular 1–3% by weight, suffices for complete polymerisation of lactam to proceed in a short time, preferably continuously conveying and mixing machines being used because of the fast initiation-reaction, in particular twin shaft extruders with an intensive mixing element in particular in the region of the FK injection.

The FI can be applied in principle continuously or also discontinuously. Discontinuous addition is suitable for application in particular with lactam-6 and at a temperature of the lactam melt of approximately 100 to 180° C.; continuous addition and continuous processes, in particular with lactam-12, preferably in the polymerisation process on the twin shaft extruder (170–300° C.).

Via the added quantity of FI, and thereby the number of starter particles which are mixed into the volume unit of lactam melt, the number of growing polylactam chains per volume unit and hence their average molecular weight can be predicted. This correlates with the rate of the monomer conversion, i.e. the polymerisation rate which is also temperature-dependent. By means of the choice of the type of FI, its concentration in the lactam melt as well as the temperature profile during polymerisation and the dwell-time, the polymerisation course and also the polylactam properties can be extensively predicted.

Hence the FI types according to the invention can be preferably used in continuous methods and lead to products with an interesting property profile.

The resultant parts are in particular characterized by good mechanical properties, in particular high toughness and rupture-strength, low abrasion, good weathering resistance and high resistance against hydrolytic degradation which has not been achieved to date.

The invention relates furthermore to polymer granulate and parts which can be produced by continuous or discontinuous anionic polymerisation-processes of lactam based on a liquid initiator as described above (patent claims 26 to 30).

The granulate according to the invention is produced preferably from lactam-6 and/or lactam-12. The liquid initiator can thereby be used in a concentration of 0.3–10% by weight, preferably 0.5–3% by weight. The process parameters for producing the polymer granulate correspond thereby to those described above. The polymer granulate according to the invention is produced preferably on a twin shaft extruder.

Its excellent storage stability should be emphasised in particular in the case of the polymer granulate. The polymer granulate can then be thermoplastically processed with shaping tools into various products, for example into pipes, profiles, films, fibres, cables, coverings, wires and filaments, or also can be used for immersion- and coating-processes, for example of preheated metal parts, all methods being operated preferably under inert gas.

The lactam polymerisation via the use of the FI according to the invention is also suitable for the direct production of shaped parts (claim 31) in continuous and discontinuous processes, such as for example in the pultrusion method directly into profiles or into granulates reinforced with long fibres that can following be shaped thermoplastically, as is common with long fibre granulates, in particular in the injection moulding process, and the fibres preferably being glass fibres or C fibres. Further methods are RTM processes, monomer moulding methods, centrifugal and rotational moulding methods and also continuous polymerisation on a twin shaft extruder into granulate or directly with subsequent shaping tools, for example direct production of pipes, profiles, fibres, cables, coverings or filaments, or also in immersion and coating processes, for example of pre-heated metal parts, the process being implemented in all methods preferably under inert gas.

The invention is intended to be explained in more detail now with reference to examples.

It should be taken into account that the initiation reaction and the subsequent polymerisation process are very much temperature-dependent. Thus the initiators in the case of LC-12 are applied preferably in methods of intensive mixing, such as for example for the polymerisation on a twin shaft extruder, in the case of LC-6 however, in a broad range of discontinuous and continuous methods, because LC-6 already melts below 70° C. (LC-12~160° C.!)

Specially suitable methods with LC-6 are hence for example monomer casting, fillers often being used to increase the dimensional stability and rigidity. The subsequent examples explain the invention.

EXAMPLES

The table preceding the examples contains the abbreviations used and the molecular weights or, in the case of bifunctional protic media, their equivalent weight.

The examples are summarised subsequently in Table form, the procedure being described more precisely respectively in the case of one series of tests of the same type and respectively part a) summarising the stoichiometric composition of the liquid initiator and part b) the polymerisation conditions and the analysis results of the polymerisation tests.

In the Tables a), the following mean 1 the isocyanate, I
2 the protic medium P, where it should be taken into account that in one example often a plurality of P media was used in combination
3 the base B which can serve in preferred cases (example Na.Ome, Na.Oet) also directly as P medium
4 the solvation media S, here also a plurality of solvation media being able to be used in combination
5 the equivalent ratio of the components used.

If a plurality of P media or S media is used in combination then their equivalent proportions are cited 6 the proportion of the batch comprising the isocyanate I, the P medium and associated cation, for example sodium
7 the concentration of the active component A of the FI, calculated respectively as equivalent of the—NCO-function per kg of the total FI formulation In Table b) which contains polymerisation tests, the following mean:

8 the proportion by weight of FI
9 the number of lactam molecules per active FI particle
10 the temperature of the lactam melt during the course of polymerisation
11 the selected polymerisation time
12 the selected lactam quantity
13 the time, after which a magnetic agitator (common construction) continuously mixing the melt remains stationary, as a consequence of the increasing viscosity of the polymerising melt
14 the relative solution viscosity of the polymer
15 the melting point maximum of the polymer from the DSC-measurement curve, in ° C.
16 the methanol extract proportion of the product comprising unconverted lactam and also S medium and released P medium.

EXAMPLES

In the examples the following mean:

| | | Equivalent Weights |
|---|---|---|
| In the case of the solvation media, S: | | |
| NMP | N-methylpyrrolidone | 99 |
| NOP | N-octylpyrrolidone | 197 |
| NOC | N-octylcaprolactam | 225 |
| DMEU | dimethylethylene urea | 114 |
| DMPU | dimethylpropylene urea | 128 |
| In the Case of the isocyanates | | |
| PI | phenylisocyanate | 119 |
| PCLPI | p-chlorophenylisocyanate | 154 |
| 3,4-DiCLPI3, | 4-dichlorophenylisocyanate | 188 |
| mMEPI | m-tolylisocyanate | 133 |
| W | methylene-bis(4-isocyanatocyclohexane | 131 |
| CHI | cyclohexylisocyanate | 125 |
| BI | butylisocyanate | 99 |
| TPI | tripropylisocyanurate | 85 |
| In the case of the protic media P | | |
| PTHF250 | amine-terminated polytetrahydrofurane | 125 |
| AeD, 3.0 | 4.7.10 trioxatridecane-1.13-diamine | 110 |
| DMPACM | 3,3' dimethyl-4,4' diaminodicyclohexylmethane | 119 |
| ITRA | isotridecylamine | 199 |
| EtOH | ethyl alcohol | 46 |
| PrOH | propyl alcohol | 60 |
| BuOH | 1-butanol | 74 |
| BuOH.2 | 2-butanol | 74 |
| BzA | benzyl alcohol | 108 |
| Oct-1; Oct-3 | octanol-1; octanol-3 | 130 |
| T770 | Tinuvin 770* | 240 |
| T312 | Tinuvin 312* | 312 |
| T571 | Tinuvin 571* | 394 |
| I5057 | Irganox 5057* | 393 |
| Ny | Nylostab S-EED** | 221 |
| In the case of carboxylic acids as P media | | |
| Bz.AeD3.0 | | 214 |
| Bz AeD3.0 | | 241 |
| Ac.ITRA | | |
| Bz ITRA | | 303 |
| Et.hs.HMD | | 184 |
| Capr.AeD3.0 | | 208 |
| Pel.HMD | | 198 |
| Ac.HMD | | 100 |

The complete amidation products are always concerned, in which the following mean:
Bz. = benzoic acid
AC = acetic acid
Et.hs = 2-ethylhexanoic acid
Capr = caproic acid
Pel = nonanoic acid
AeD, 3.0 = 4.7.10.-trioxatridecane-1.13-diamine,
ITRA = isotridecylamine
HMD = 1,6 diaminohexane
*commercial products of the company Ciba SC, Basle
**commercial product of the company Clariant, Basle

| In the case of the bases B (which can also act as capping media) | | |
|---|---|---|
| NaOMe | sodium methylate | 54 |
| NaH | sodium hydride | 24 |
| Na—M | metallic sodium | 23 |
| NaOEt | sodium ethylate | 68 |

Examples 1 to 5

Example 1 to 5 describes the production and application of liquid initiators FI for the polymerisation of lactam, in particular of lactam-12 based on different isocyanates. It has thereby been shown that aromatic isocyanate, such as for example phenyl isocyanate, dissolved in a solvation medium, passes through a trimerisation reaction into isocyanurate when made basic.

According to the synthesis block of Table 1, the synthesis was controlled in such a way that, as first reaction step, the trimerisation of monoisocyanate into isocyanurate proceeds directly in the solvation medium and, after that, the sodium methylate, dissolved in methanol or also directly in powder-form, is added as protic medium and base.

As a general production rule, the following procedure was chosen and the reactions taken place in dry nitrogen and all the feed materials having been freed of residual moisture as far as possible:

The solvation medium S is provided with 2% of the base proportion and pre-heated to approximately 80° C. After that, the isocyanate is added in portions, and the addition is controlled such that the temperature of the reaction mass never exceeds 110° C. Because of the relatively high reaction heat of the trimerisation reaction, this reaction step must always be carefully controlled. After completion of the isocyanurate formation, which can be followed for example via IR spectroscopy and have come to completion after approximately 1 h, the reaction solution can be cooled to approximately 80° C. and then the sodium methylate is dropped in, as approximately 30% solution in methanol, at a temperature of the reaction mixture of approximately 80° C. whilst the methanol is continuously withdrawn under the action of vacuum. After completion of the methylate addition, the vacuum is increased from initially approximately 200 to approximately 50 torr, and it is maintained until the residual methanol is completely removed, which is the case after respectively 30 minutes. Clear solutions of the FI in S respectively are obtained and have a generally reddish intrinsic colour.

These liquid initiators are summarised in Table 1a). The associated polymerisation tests are contained in Table 1b). Thereby the general polymerisation rule is: lactam-12 is melted in an Erlenmeyer flask under a blancket of dry nitrogen, and the melt is agitated with a magnetic stirrer. After the lactam melt has been kept at polymerisation temperature for 10 minutes, the FI is added rapidly with a liquid metering unit and after that the time is measured until the force of the agitator drive no longer suffices to keep the magnetic agitator in rotation; after that, the agitator is rapidly removed.

This time which is characteristic for the respective FI, described as $T_u$, is recorded in the Table in column 13. Polymerisation is then completed without agitation, the polymer, which occurs as a disc, is removed and then the relative solution viscosity is measured on drilling chips on a 0.5% solution in meta-cresol according to the aim and requirement, the melting point maximum is determined by means of the DSC method and the sample is extracted with methanol and the extraction residue is determined gravimetrically.

The results compiled in the Table and additional storage tests show that storage-stable FI types could be produced with all the isocyanates used, said FI types initiating the polymerisation with variable time delay which is verified by the different $T_u$ times and the further analysis results.

Examples 6 to 17

Table 2 shows in the examples 6 to 17 liquid initiators based on phenyl isocyanate PI with different protic media. Again Table 2a) comprising the stoichiometric ratio of the starter materials and Table 2b) the polymerisation conditions and the analysis results. For the entire test series, aromatic isocyanate (PI) was used in the trimerised isocyanurate dissolved in a part of the S-medium NMP (solution a)), and in parallel, the P media was dissolved in an additional proportion of S medium and with the base NaOMe deprotonated into its salt form. Stoichiometric proportions of a) were then combined with deprotonated, solvated medium P and thereby a subsequent reaction was induced such that FI resulted with stoichiometry according to Table 2a).

The following procedure was implemented in order to produce solution a). In 693 g NMP, 4.75 g NaOMe were dissolved for the purpose of basification and the solution was heated to 80° C. 208 g PI were then dropped in slowly within half an hour such that the temperature of the solution did not rise above 110° C. (positive reaction heat of the trimerisation reaction) and then was left at 80–100° C. for 0.5 h so that all the PI was converted into the isocyanurate form. The reaction mixture was then divided into identical portions containing respectively 0.175 mol trimerised PI.

As the column for the equivalent ratio of the components shows, 8 molecules of S medium were used thereby, from which 4 molecules NMP per PI were used to produce solution a) and the remaining 4 S molecules, partly of different types, were used for the production of the P medium in deprotonated form. The P medium was dissolved in S for this purpose and the solution was heated to 80–100° C. At this temperature, NaOMe as 30% solution in methanol was then dropped in and methanol was continuously withdrawn by the action of vacuum, a vacuum being set of approximately 200 torr which, after total NaOMe addition was completed, dropped to approximately 50 torr and subsequently was maintained for approximately further 30 minutes. Then, the reaction mixture a), pre-heated to 80° C., was combined with the separately produced solution of deprotonated P, and post-reacted for approximately 10 min at 80–100° C., and the formed FI was then cooled to room temperature and used for the polymerisation tests.

As the polymerisation results of Tests 6–13 show, these liquid catalysts initiate the polymerisation with pronounced time delay, after a total polymerisation time of 25 minutes only low polymerisation degrees, ($\eta$rel values) and melting points occurring with relatively high extract values.

In Test 14, 15, 16 and 17, PA stabilisers with amide- and sterically hindered amine- and phenol groups in an deficiency are used as special P medium for PI and for the base, as a result of which a part of the base remains directly as P medium.

The analysis results of the standard polymerisation test verify again that these liquid initiators are suitable for practical application.

Examples 18 to 20 (Table 3)

In these examples, ethanol, propanol and butanol, respectively in NMP, were converted directly according to a normal method with NaH into alcoholate and then converted with an equivalent mol proportion of solution a) (trimerised PI in NMP) into FK. The mol ratio of the components is contained in Table 3a) and the results of the polymerisation tests in Table 3b).

Similarly to the Examples 1 to 5, where NaOMe respectively served directly as P medium, relatively short $T_u$ times with high $\eta$rel values are found with these short-chain alcohols.

Examples 21 to 30 (Table 4)

Linear carboxamides were used as P medium in Tests 21 to 30. They were produced according to normal methods by water elimination from the free amine and from the free acid. Nylostab S-EED® is used as carboxamide in addition in Test 29.

On the one hand, again separately produced, trimerised phenylisocyanate was used as acylation component in the FI (solution a)); see Example 6–17) and in the Tests 27–29, the aliphatic cyclohexylisocyanate was used directly and in Test 29 the aliphatic dicyclohexyldiisocyanate was used.

In order to provide the individual test samples, the corresponding carboxamide respectively in S, corresponding to Tests 6–17, was deprotonated with NaOMe into the Na salt and the two solutions were thereafter combined at 80–100° C.

The resulting liquid initiators show in total a good behaviour with respect to initiation and propagation of the polymerisation of lactam-12. This could be attributed to the fact that linear carboxamide has approximately the same acidity with respect to the eliminatable H-atom as the lactams.

Tests 31 to 34

Table 5 compiles the results with aliphatic monoisocyanates, which are converted without using special P media directly with NaOMe. In part various synthesis paths were thereby taken as follows.

In Test 31 and 32, the isocyanate was dissolved in DPMU, which contained 3% of the total quantity of NaOMe already, at 80° C. and was left for 1 h at 80° C. for the purpose of complete progress of the trimerisation reaction. The sodium methylate was added thereafter as methanolic solution according to the described method and then the methyl alcohol was removed.

In Test 33, where TPI already represents the isocyanurate form derived from propylisocyanate, the TPI was dissolved in the solvation medium at 80° C. and, directly subsequently, methanolic NaOMe was added according to a normal method and the alcohol was removed, after which the liquid initiator was present.

In Test 34, liquid initiator, based on CHI, was produced according to another method: Thereby the total quantity of NaOMe was introduced at 100° C. into the DMPU proportion and all free methanol was removed (solution a). Separately, cyclohexylisocyanate CHI was dissolved in NOP at 80° C. and then fed into solution a) with agitation until the reaction mixture was clear, then it was cooled to room temperature.

Test 35

In addition, a test was done to see whether a part of the isocyanate I can be replaced by carbodiimide in the FI according to the invention.

For this purpose, in a reaction batch of 30 g of solid material PI and dicyclohexyl carbodiimide DCC was used in a mol ratio of 60:40. Additianlally 0,8 parts of Nylostab S-EED was deprotonated with 1.02 NaOMe (each equivalent parts relative to PI+DCC) the reaction having been implemented in the S medium of 4 DMPU and 3 NMP (per mol parts relative to the sum of PI+DCC).

For this purpose, Ny was dissolved in S, the solution heated to 100° C., after that NaOME was added as 30% solution in MeOH and after that the PI was added in drops. Subsequently, a vacuum was applied for 30 min at 100° C., then the DCC was added at 100° C. whilst left for a further 10 min at 100° C. and then cooled.

An FI resulted without a solid material proportion which leads to a time $t_u$ of 26 sec in the polymerisation test and the conditions as described in Table 1b), and led to polylactam-12 with an SMP of 176° C. at a solution viscosity of 1.849.

In addition, many application test were implemented with the described liquid initiators.

It was shown thereby as a general rule that in the case of lactam-12 polymerisation can be greatly accelerated by temperature increase.

If an FI is used thereby with which an ηrel of at least 1.8 is achieved at 200° C. and in 30 minutes, then its application concentration is 0.5% equivalent relative to the lactam-12 concentration (1 FI particle to 200 lactam molecules), then a polimerization time of approximately 5 minutes at 250° and only approximately 1 minute at 300° C. is sufficient for the complete conversion of lactam into polylactam (residual lactam content 0.5–1.0% by weight). If this temperature is maintained for longer then, particularly at high temperatures, side reactions result and cross-linking structures known from the literature then may become dominant, and hence on the one hand the strength and toughness increases but on the other hand the further processability is more difficult.

Further with FI according to Test 1, 16 and 17 and a dosage of 0.5% equivalent relative to lactam, lactam-6 was converted into the polylactam.

The lactam was dried carefully for this purpose. The polymerisation was effected identically to the conditions for lactam-12, i.e. for 30 minutes at 200° C. The products according to Test 1 respectively 16 and 17 have residual lactam contents of 6.6, 8.9 and 9.3% by weight and SMP maxima in the DSC of approximately 215° C. and show spontaneous release from the vessel wall.

TABLE 1a)

| No. | isocyanate 1 | P medium type 2 | base, B type 3 | S medium type 4 | Equivalent ratio I:P:B:S 5 | Batch solid material g 6 | Conc. A mol/kg 7 |
|---|---|---|---|---|---|---|---|
| 1 | PI | ide with B | NaOMe | NMP | 3 - 2 10 | 30 | 1.245 |
| 2 | PI | ide with B | NaOMe | NMP | 1 - 1 6 | 30 | 1.30 |
| 3 | PCLPI | ide with B | NaOMe | NMP | 1 - 1 6 | 20 | 1.25 |
| 4 | 3,4-DiCLPI | ide with B | NaOMe | NMP | 1 - 1 6 | 20 | 1.16 |
| 5 | m-MePI | ide with B | NaOMe | NMP NOP | 1 - 1 4 2 | 20 | 1.02 |

TABLE 1b)

| | Polymerisation conditions | | | | Analysis results | | | % extract |
|---|---|---|---|---|---|---|---|---|
| No. | % by wt for PG.N 8 | 9 | T, °C. 10 | t, min 11 | LC-12 12 | Tu, sec 13 | ηrel 14 | DSC max 15 | 16 |
| 1 | 2.06 | 200 | 200 | 25 | 100 | 20 | 1.75 | 175 | 6 |
| 2 | 1.92 | 200 | 200 | 25 | 100 | 10 | 2.10 | 175 | 5 |
| 3 | 2.00 | 200 | 200 | 25 | 100 | 46 | 2.03 | 171 | 10 |
| 4 | 2.12 | 200 | 200 | 25 | 100 | 57 | 1.77 | 174 | 14.4 |
| 5 | 2.45 | 200 | 200 | 25 | 100 | 43 | 1.72 | 166 | 17.6 |

TABLE 2a)

| No. | isocyanate 1 | P medium type 2 | base type 3 | S medium type 4 | Equivalent ratio I:P:B:S 5 | | | | Batch solid material g 6 | Conc. A mol/kg 7 |
|---|---|---|---|---|---|---|---|---|---|---|
| 6 | PI | PTHF 250 | NaOMe | NMP | 1 | 1 | 1 | 8 | 47 | 0.95 |
| 7 | PI | AeD, 3.0 | NaOMe | NMP | 1 | 1 | 1 | 8 | 45 | 0.96 |
| 8 | PI | DMPACM | NaOMe | NMP | 1 | 1 | 1 | 8 | 46 | 0.95 |
| 9 | PI | ITRA | NaOMe | NMP NOC | 1 | 1 | 1 | 6 2 | 60 | 0.72 |
| 10 | PI | Oct-1 | NaOMe | NMP | 1 | 1 | 1 | 8 | 48 | 0.84 |
| 11 | PI | Oct-3 | NaOMe | NMP | 1 | 1 | 1 | 8 | 48 | 0.94 |
| 12 | PI | BzA | NaOMe | NMP | 1 | 1 | 1 | 8 | 44 | 0.96 |
| 13 | PI | T 770 | NaOMe | NMP DMPU | 1 | 1 | 1 | 4 4 | 67 | 0.78 |
| 14 | PI | Ny | NaOMe | NMP DMPU | 1 | 1 | 1 | 4 4 | 64 | 0.79 |
| 15 | PI | Ny T571 | NaOMe | NMP DMPU | 1 | 0.4 0.4 | 1 | 4 4 | 65 | 0.76 |
| 16 | PI | I 5057 | NaOMe | NMP NOP | 1 | 0.2 | 1 | 4 3 | 17.3 | 0.81 |
| 17 | PI | Ny I 5057 | NaOMe | NMP NOP | 1 | 0.36 0.14 | 1 | 4 3 | 19.8 | 0.79 |

TABLE 2b)

| | Polymerisation conditions | | | | Analysis results | | | % extract |
|---|---|---|---|---|---|---|---|---|
| No. | % by wt for PG.N 8 | 9 | T, °C. 10 | T, min 11 | LC-12 12 | Tu, sec 13 | ηrel 14 | DSC max 15 | 16 |
| 6 | 5.28 | 100 | 200 | 25 | 100 | 260 | 1.412 | 165 | 21 |
| 7 | 5.20 | 100 | 200 | 25 | 100 | 350 | 1.402 | 168 | 28 |
| 8 | 5.26 | 100 | 200 | 25 | 100 | 440 | 1.364 | 159 | 30 |
| 9 | 6.92 | 100 | 200 | 25 | 100 | 410 | 1.403 | 161 | 22 |
| 10 | 5.30 | 100 | 200 | 25 | 100 | 308 | 1.407 | 163 | 23 |
| 11 | 5.30 | 100 | 200 | 25 | 100 | 300 | 1.398 | 172 | 24 |
| 12 | 5.20 | 100 | 200 | 25 | 100 | 296 | 1.420 | 163 | 21 |
| 13 | 6.44 | 100 | 200 | 25 | 100 | 166 | 1.391 | 171 | 14 |
| 14a | 6.34 | 100 | 200 | 25 | 100 | 10 | 1.531 | 176 | 3 |
| 14b | 3.17 | 200 | 200 | 25 | 100 | 15 | 1.848 | 177 | 4 |
| 15 | 3.30 | 200 | 200 | 25 | 100 | 13 | 1.957 | 176 | 5 |
| 16 | 3.10 | 200 | 200 | 25 | 100 | 20 | 2.347 | 166 | 12 |
| 17 | 3.20 | 200 | 200 | 25 | 100 | 40 | 2.177 | 169 | 11 |

TABLE 3a)

| No. | isocyanate 1 | P medium type 2 | base, B type 3 | S medium type 4 | Equivalent ratio I:P:B:S 5 | | | | Batch solid material g 6 | Conc. A mol/kg 7 |
|---|---|---|---|---|---|---|---|---|---|---|
| 18 | PI | EtOH | NaH | NMP | 1 | 1 | 1 | 8 | 13.2 | 1.02 |
| 19 | PI | PrOH | NaH | NMP | 1 | 1 | 1 | 8 | 14.1 | 1.02 |
| 20 | PI | BuOH | NaH | NMP | 1 | 1 | 1 | 8 | 15.0 | 1.02 |

TABLE 3b)

| | Polymerisation conditions | | | | Analysis results | | | |
|---|---|---|---|---|---|---|---|---|
| No. | % by wt for PG.N 8 | T, °C. 9 | T, min 10 | LC-12 11 | Tu, sec 12 | ηrel 13 | DSC max 14 | % extract 15 |
| 18 | 2.45 | 200 | 200 | 25 | 100 | 19 | 2.629 | 167 | 9 |
| 19 | 2.45 | 200 | 200 | 25 | 100 | 40 | 2.172 | 163 | 20 |
| 20 | 2.50 | 200 | 200 | 25 | 100 | 31 | 2.337 | 171 | 15 |

TABLE 4a)

| No. | isocyanate 1 | P medium type 2 | base, B type 3 | S medium type 4 | Equivalent ratio I:P:B:S 5 | | | | Batch solid material g 6 | Conc. A mol/kg 7 |
|---|---|---|---|---|---|---|---|---|---|---|
| 21 | PI | Bz.AeD, 3.0 | Na.O.Me | NMP | 1 | 1 | 1 | 6 | 23.2 | 0.74 |
|    |    |             |          | NOP | 1 | 1 | 1 | 2 |      |      |
| 22 | PI | Ac.ITRA | Na.O.Me | NMP | 1 | 1 | 1 | 6 | 25.2 | 0.73 |
|    |    |         |          | NOP | 1 | 1 | 1 | 2 |      |      |
| 23 | PI | Bz.ITRA | Na.O.Me | NMP | 1 | 1 | 1 | 5 | 29.5 | 0.65 |
|    |    |         |          | NOP | 1 | 1 | 1 | 3 |      |      |
| 24 | PI | Et.hs.HMD | Na.O.Me | NMP | 1 | 1 | 1 | 6 | 21.2 | 0.76 |
|    |    |           |          | NOP | 1 | 1 | 1 | 2 |      |      |
| 25 | PI | Capr.AeD, 3.0 | Na.O.Me | NMP | 1 | 1 | 1 | 6 | 24.1 | 0.74 |
|    |    |               |          | NOP | 1 | 1 | 1 | 2 |      |      |
| 26 | PI | Pel.HMD | Na.O.Me | NMP | 1 | 1 | 1 | 5 | 23.4 | 0.80 |
|    |    |         |          | NOP |   |   |   |   |      |      |
| 27 | CHI | Ac.ITRA | Na.O.Me | DMPU | 1 | 1 | 1 | 2 | 20 | 0.77 |
| 28 | CHI | Ac.HMD | Na.O.Me | DMPU | 1 | 1 | 1 | 7 | 20 | 0.97 |
|    |     |        |         |      | 1 | 1 | 1 |   |    |      |
| 29 | CHI | Ny | Na.O.Me | NMP | 1 | 1 | 1 | 6 | 20 | 0.86 |
|    |     |    |         | NOP | 1 | 2 | 2 |   |    |      |
| 30 | W | Ac.ITRA | Na.O.Me | DMPU | 4₂ | | | 10 | 20 | 0.94 |

TABLE 4b)

| | Polymerisation conditions | | | | Analysis results | | | |
|---|---|---|---|---|---|---|---|---|
| No. | % by wt for PG.N 8 | T, °C. 9 | t, min 10 | LC-12 11 | Tu, sec 12 | ηrel 13 | DSC max 14 | % extract 15 |
| 21 | 3.4 | 200 | 200 | 25 | 100 | 10 | 2.24 | 171 | 4.8 |
| 22 | 3.4 | 200 | 200 | 25 | 100 | 14 | 1.73 | 175 | 3.4 |
| 23 | 3.8 | 200 | 200 | 25 | 100 | 16 | 1.85 | 173 | 4.0 |
| 24 | 3.3 | 200 | 200 | 25 | 100 | 12 | 2.05 | 173 | 4.8 |
| 25 | 3.4 | 200 | 200 | 25 | 100 | 13 | 1.98 | 173 | 5.0 |
| 26 | 3.1 | 200 | 200 | 25 | 100 | 18 | 2.39 | 163 | 8.9 |
| 27 | 3.3 | 200 | 200 | 30 | 50  | 20 | 1.97 | 176.7 | 5.5 |
| 28 | 2.6 | 200 | 200 | 30 | 50  | 14 | 2.26 | 176.4 | 5.1 |
| 29 | 2.9 | 200 | 200 | 30 | 50  | 9  | 1.55 | 176.2 | 1.6 |
| 30 | 2.7 | 200 | 200 | 30 | 50  | 14 | 2.35 | 172.4 | 5.1 |

TABLE 5a)

| No. | isocyanate 1 | P medium type 2 | base, B type 3 | S medium type 4 | Equivalent ratio I:P:B:S 5 | Batch solid material g 6 | Conc. A mol/kg 7 |
|---|---|---|---|---|---|---|---|
| 31 | CHI | ide with B | Na.O.Me | DMPU | 1 - 1 8 | 20 | 0.844 |
| 32 | BI | ide with B | Na.O.Me | NMP<br>NOP | 1 - 1 5<br>1 - 1 5 | 15 | 0.676 |
| 33 | TPI | ide with B | Na.O.Me | NMP<br>NOP | 1 - 1 5<br>1 - 1 5 | 15 | 0.675 |
| 34 | CHI | ide with B | Na.O.Me | DMPU<br>NOP | 1 - 1 4<br>1 - 1 4 | 20 | 0.676 |

TABLE 5b)

| | Polymerisation conditions | | | | | Analysis results | | | |
|---|---|---|---|---|---|---|---|---|---|
| No. | % by wt 8 | for PG.N 9 | T, °C. 10 | t, min 11 | LC-12 12 | Tu, sec 13 | ηrel 14 | DSC max 15 | % extract 16 |
| 31 | 2.56 | 200 | 200 | 25 | 100 | 12 | 1.96 | 168 | 5.8 |
| 32 | 3.70 | 200 | 200 | 25 | 100 | 62 | 1.81 | 162 | 21.8 |
| 33 | 3.70 | 200 | 200 | 25 | 100 | 15 | 2.27 | 174 | 8.5 |
| 34 | 3.70 | 200 | 200 | 25 | 100 | 14 | 2.10 | 171 | 9.9 |

What is claimed is:

1. A liquid initiator for implementation of anionic lactam polymerisation, comprising a conversion product of isocyanate I with a protic compound P which is selected from alcohols with 1 to 5 C-atoms, carboxamides, and/or sterically hindered aliphatic amines and a base B in an aprotic solvation medium S.

2. The liquid initiator according to claim 1, wherein the isocyanate has an aliphatic, cycloaliphatic, aromatic or aliphatic-aromatic basic structure.

3. The liquid initiator according to claim 2, wherein the isocyanate I is chosen from phenylisocyanate and substituted phenylisocyanates, cyclohexylisocyanate, toluylenediisocyanate, isophoronediisocyanate, diphenylmethanediisocyanate, dicyclohexylmethylenediisocyanate and hexamethylenediisocyanate or mixtures thereof.

4. The liquid initiator according to claim 2, wherein the isocyanates occur completely or partly in cyclised form.

5. The liquid initiator according to claim 1, comprising a conversion product in which the isocyanate has been replaced by 1–50% equivalent carbodiimide.

6. The liquid initiator according to claim 1, wherein the protic compound P has a $pk_A > 13$.

7. The liquid initiator according to claim 1, wherein the protic compound P is selected from alcohols with 1–5 C-atoms, carboxamides, and/or sterically hindered aliphatic amines.

8. The liquid initiator according to claim 7, wherein the carboxamides are composed of linear and/or cyclic monomers, with 2–20 C-atoms.

9. The liquid initiator according to claim 1, wherein the cation of the base B is an alkali- or alkaiine earth ion or tetraalkylammonium and the base is selected from alcoholate, amide, hydride or alkyl anion.

10. The liquid initiator according to claim 9, wherein the base B is an alkali- or alkaline earth alcoholate.

11. The liquid initiator according to claim 1, wherein the solvation medium S is an aliphatic, cycloaliphatic or aromatic organic compound which has solvating structural elements which have no azide 11-atoms.

12. The liquid initiator according to claim 11, wherein the solvation medium S is a polar aprotic compound selected front the group, etherified polyglycols, liquid phthalic ester, N-alkylated urea compounds, N-alkylated carboxamides or mixtures thereof.

13. The liquid initiator according to claim 12, wherein the area compound is a tetraalkyl urea with 1–12 C-atoms, selected from the group, tetramethyl urea tetraethyl urea, tetrabutyl urea, or cyclic structure according to the general Formula 1.

(I)

in which R is an alkyl radical with 1–5 C-atoms, and n being 2 or 3.

14. The liquid initiator according to claim 12, wherein S is a cyclic 5–7 member N-alkylated carboxamide and the alkyl radical has 1–12 C-atoms, heteroatoms also being able to be contained.

15. The liquid initiator according to claim 12, wherein S is N-methylpyrrolidone, N-octylpyrrolidone, N-cyclohexyl pyrrolidone, N-octylcaprolactam or a mixture thereof.

16. The liquid initiator according to claim 12, wherein the solvation medium is a mixture of urea derivative and acid amide.

17. The liquid initiator according to claim 1, wherein it contains additionally production-conditioned and/or usage-conditioned additives.

18. The liquid initiator according to claim 1, wherein the conversion product has been obtained with the proviso that B:P:1 in a ratio 0.2–1.1:0.2–4:1 has been used.

19. The liquid initiator according to claim 18, wherein the mol ratio B:P:1 is 0.8–1.1:0.8–1.2:1.

20. A method for producing a liquid initiator according to claim 1, wherein the conversion product is produced in the solvation medium S under inert gas and exclusion of moisture on from room temperature and up to 140° C. low molecular solvents for the base and neutralisation products of the base, in particular low molecular alcohols, being removed.

21. The method according to claim 20, wherein the compound P is converted with the base R in a predisposed step so that P occurs in its basic form, and thus the deprolonated compound P is then added to the isocyanate that is dissolved in the solvation medium S.

22. The method according to claim 20, wherein the isocyanate is subjected in a predisposed conversion step to a cyclisation into isocyanurate and subsequently the reaction is continued with stoichiometric base addition.

23. The method according to claim 20, wherein the protic compound P is dissolved separately in a proportion of solvation medium S and P is converted via the action of the base B into the anionic salt form and volatile reaction products and also solvent- and solvation medium components, which impede polymerisation, are removed, and in that the isocyanate in the solvation medium S and the deprotonated compound dissolved in the solvation medium S are then combined and converted into liquid initiator.

24. The method according to claim 20, wherein the isocyanate I is converted with the protic compound P and this capped isocyanate is subsequently deprotonated by means of a base and thus converted into F1.

25. The method according to claim 23, wherein the isocynanate is used in the trimerised form.

26. A polymer granulate producible by continuous or discontinuous anionic polymerisation of lactam with a liquid initiator according to claim 1.

27. The polymer granulate according to claim 26, wherein lactam-6 and/or lactam-12 has been used as lactam.

28. The polymer granulate according to claim 26, wherein the liquid initiator has been added to the lactam melt in a concentration of 0.3–10% by weight.

29. The polymer granulate according to claim 28, wherein a concentration of the liquid initiator of 0.5–3% by weight has been set.

30. The polymer granulate according to claim 26, wherein the polymer granulate has been produced continuously on a twin shaft extruder.

31. A method for direct production of utility objects formed from polylactam in a discontinuous or continuous process of the type monomer casting, extrusion, centrifugal moulding, injection moulding, rotational moulding, pultrusion methods, immersion methods and spraying methods comprising adding the liquid initiator of claim 1 respectively to the lactam melt.

32. The liquid initiator according to claim 5, wherein the protic compound P occurs in deprotonated form.

33. The liquid initiator according to claim 13, wherein R of the cyclic structure of the general formula I is a methyl radical.

* * * * *